United States Patent
Chen et al.

(10) Patent No.: US 9,451,525 B2
(45) Date of Patent: Sep. 20, 2016

(54) METHOD, DEVICE AND SYSTEM FOR STARTING ROUTING FUNCTION AND TRANSMITTING DATA

(71) Applicant: Huawei Device Co., Ltd., Shenzhen (CN)

(72) Inventors: Ji Chen, Shenzhen (CN); Zhiming Ding, Shenzhen (CN); Ping Fang, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 249 days.

(21) Appl. No.: 14/138,458

(22) Filed: Dec. 23, 2013

(65) Prior Publication Data
US 2014/0105067 A1 Apr. 17, 2014

Related U.S. Application Data

(63) Continuation of application No. PCT/CN2013/077467, filed on Jun. 19, 2013.

(30) Foreign Application Priority Data

Jun. 30, 2012 (CN) .......................... 2012 1 0222898

(51) Int. Cl.
H04W 40/02 (2009.01)
H04L 12/24 (2006.01)

(52) U.S. Cl.
CPC .............. *H04W 40/02* (2013.01); *H04L 41/12* (2013.01)

(58) Field of Classification Search
None
See application file for complete search history.

(56) References Cited

U.S. PATENT DOCUMENTS

| | | | | |
|---|---|---|---|---|
| 6,654,359 | B1* | 11/2003 | La Porta | H04L 29/12216 370/328 |
| 2004/0252696 | A1* | 12/2004 | Kakishima | H04L 12/66 370/395.2 |
| 2009/0252134 | A1* | 10/2009 | Schlicht | H04L 1/0015 370/338 |
| 2010/0131672 | A1* | 5/2010 | Karaoguz | H04L 45/00 709/238 |

(Continued)

FOREIGN PATENT DOCUMENTS

| | | |
|---|---|---|
| CN | 1525661 A | 9/2004 |
| CN | 1717078 A | 1/2006 |

(Continued)

OTHER PUBLICATIONS

Foreign Communication From a Counterpart Application, Chinese Application No. 201210222898.8, Chinese Office Action dated Nov. 24, 2014, 5 pages.

(Continued)

*Primary Examiner* — Andrew Lai
*Assistant Examiner* — Jamaal Henson
(74) *Attorney, Agent, or Firm* — Conley Rose, P.C.; Grant Rodolph; Adam J. Stegge

(57) ABSTRACT

A method, a device and a system for enabling a routing function and transmitting data, which relate to the field of communications, and are capable of sharing a single session task through a plurality of access points, thereby ensuring data transmission quality. When a station uses an external network identifiable address, and performs data transmission of a single session task through a first access point, an address of a club routing function (CR) router connected to the first access point is determined; at least one second access point connected to the same CR router with the first access point is determined.

14 Claims, 12 Drawing Sheets

(56) References Cited

U.S. PATENT DOCUMENTS

| | | | |
|---|---|---|---|
| 2010/0154044 A1* | 6/2010 | Manku | H04L 12/5691 726/7 |
| 2013/0077562 A1* | 3/2013 | Boltz | H04B 7/18534 370/316 |
| 2014/0287760 A1 | 9/2014 | Spinelli et al. | |

FOREIGN PATENT DOCUMENTS

| | | |
|---|---|---|
| CN | 1968269 A | 5/2007 |
| CN | 101790196 A | 7/2010 |
| CN | 101919303 A | 12/2010 |
| CN | 102739541 A | 10/2012 |
| WO | 2009129516 A1 | 10/2009 |

OTHER PUBLICATIONS

Partial English Translation and Abstract of Chinese Patent Application No. CN1717078A, Feb. 25, 2014, 5 pages.

Partial English Translation and Abstract of Chinese Patent Application No. CN1968269A, Part 1, Feb. 25, 2014, 10 pages.

Partial English Translation and Abstract of Chinese Patent Application No. CN1968269A, Part 2, Feb. 25, 2014, 2 pages.

Partial English Translation and Abstract of Chinese Patent Application No. CN101790196A, Part 1, Feb. 25, 2014, 6 pages.

Partial English Translation and Abstract of Chinese Patent Application No. CN101790196A, Part 2, Feb. 25, 2014, 4 pages.

Foreign Communication From a Counterpart Application, PCT Application No. PCT/CN2013/077467, English Translation of International Search Report dated Sep. 26, 2013, 3 pages.

Foreign Communication From a Counterpart Application, PCT Application No. PCT/CN2013/077467, Written Opinion dated Sep. 26, 2013, 7 pages.

"Part 11: Wireless LAN Medium Access Control (MAC) and Physical Layer (PHY) Specifications," IEEE Std 802.11, Mar. 29, 2012, 2793 pages.

* cited by examiner

METHOD, DEVICE AND SYSTEM FOR STARTING ROUTING FUNCTION AND TRANSMITTING DATA

CROSS-REFERENCE TO RELATED APPLICATION

This application is a continuation of International Application No. PCT/CN2013/077467, filed on Jun. 19, 2013, which claims priority to Chinese Patent Application No. 201210222898.8, filed with the Chinese Patent Office on Jun. 30, 2012, both of which are incorporated herein by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications, and in particular, to a method, a device and a system for starting a routing function and transmitting data.

BACKGROUND

In a wireless fidelity (WiFi) network structure, an access point (AP) is connected to an external network via a routing device, and a station (STA) accesses the external network such as the Internet through the access point. In an actual application, a station can be associated with a plurality of access points simultaneously, thereby transmitting data of different session tasks via different access points.

During implementation of the foregoing technical solution, the inventors find that the prior art at least has the following problems: in the prior art, the data of a single session task of a station is transmitted through the same access point, and the data for the same session task cannot be transmitted via a plurality of access points. Therefore, when the bandwidth needed by a single session task of a station exceeds the maximum value of the bandwidth of an access point bearing the session task, other access points cannot be used to share data, so that data transmission quality is affected.

SUMMARY

Embodiments of the present invention provide a method, a device and a system for starting a routing function and transmitting data, which are capable of sharing a single session task through a plurality of access points, thereby ensuring data transmission quality.

In order to achieve the foregoing objective, the embodiments of the present invention adopt the following technical solutions.

A method for enabling a routing function relates to the station side, and includes: when a station uses an external network identifiable address, and performs data transmission of a single session task through a first access point, determining an address of a club routing function (CR) router connected to the first access point; determining at least one second access point, in which the second access point and the first access point are connected to the same CR router; the first access point and the second access point are access points associated with the CR of the station; sending a CR enabling request message to a CR router corresponding to the CR router address through each of the access points associated with the CR of the station, in which the external network identifiable address used by the station and an available bandwidth resource allocated to the station by an access point forwarding the CR enabling request message are recorded in the CR enabling request message; and receiving a CR enabling feedback message, in which the CR enabling feedback message is returned by the CR router and forwarded via the access points associated with the CR of the station, so that the station sends different data packets of the single session task through the first access point and the second access point separately.

A method for enabling a routing function relates to a side of a router, and includes: receiving a CR enabling request message sequentially, in which the CR enabling request message is sent from the station and forwarded by the first access point and the second access point, and an external network identifiable address used by the station and an available bandwidth resource allocated to the station by an access point forwarding the CR enabling request message are recorded in the CR enabling request message; the first access point and the second access point are access points associated with the CR of the station; recording correspondence between the external network identifiable address used by the station and a distribution address identifier of each of the first access point and the second access point, so that the CR router selects a downlink access point according to the available bandwidth resource of the access point and the correspondence, in which the distribution address identifier is sent to the CR router when the first access point and the second access point forward the CR enabling request message; and sending a CR enabling feedback message to the station via the first access point and the second access point, so that the station is capable of sending different data packets of a single session task through the first access point and the second access point separately.

A method for transmitting data relates to the station side, and includes: for each uplink data packet of a single session task to be sent, selecting, according to available bandwidth resources allocated to a station by access points associated with a CR of the station, an uplink access point from the access points associated with the CR of the station, and sending different uplink data packets to a CR router via the uplink access point, in which the uplink data packet includes a source address and a destination address of the uplink data packet, so that the CR router forwards each uplink data packet to the destination address of the uplink data packet; the destination address of the uplink data packet is a peer end address of the single session task.

A method for transmitting data relates to a side of a router, and includes: receiving each uplink data packet of a single session task, in which the uplink data packet is sent by a station and forwarded via an uplink access point, and the uplink data packet includes a source address and a destination address; the destination address of the uplink data packet is a peer end address of the single session task; and sending the uplink data packet to the destination address of the uplink data packet.

In another aspect, a method for transmitting data relates to a side of a router, and includes: receiving each downlink data packet of a single session task sent from a source address of a downlink data packet, in which the downlink data packet includes a destination address of the downlink data packet;

finding a corresponding distribution address identifier according to the destination address of the downlink data packet, in which the distribution address identifier is formed of an address of an access point associated with a CR of a station and a port number that is used for communicating with the station; and selecting a downlink access point according to an available bandwidth resource allocated to the station by the access point associated with the CR of the station and the distribution address identifier, sending the downlink data packet to the downlink access point, and forwarding, by the downlink access point, the downlink data packet to the station.

In another aspect, a method for transmitting data relates to the station side, and includes: receiving, via a downlink access point, a downlink data packet forwarded by a CR router; and using the downlink data packet according to a sequence of the downlink data packet.

A station includes: a CR router determining unit configured to: when a station uses an external network identifiable address, and performs data transmission of a single session task through a first access point, determine an address of a CR router connected to the first access point; a second access point determining unit configured to determine at least one second access point, in which the second access point and the first access point are connected to the same CR router; the first access point and the second access point are access points associated with the CR of the station; a CR enabling request sending unit configured to send a CR enabling request message to a CR router corresponding to the CR router address through each of the access points associated with the CR of the station, in which the external network identifiable address used by the station and an available bandwidth resource allocated to the station by an access point forwarding the CR enabling request message are recorded in the CR enabling request message; and a CR enabling feedback receiving unit configured to receive a CR enabling feedback message, in which the CR enabling feedback message is returned by the CR router and forwarded via the access points associated with the CR of the station, so that the station sends different data packets of the single session task through the first access point and the second access point separately.

A CR router includes: a CR enabling request receiving unit configured to receive a CR enabling request message sequentially, in which the CR enabling request message is sent from the station and forwarded by the first access point and the second access point, and an external network identifiable address used by the station and an available bandwidth resource allocated to the station by an access point forwarding the CR enabling request message are recorded in the CR enabling request message; the first access point and the second access point are access points associated with the CR of the station; a correspondence recording unit configured to record correspondence between the external network identifiable address used by the station and a distribution address identifier of each of the first access point and the second access point, so that the CR router selects a downlink access point according to the available bandwidth resource of the access point and the correspondence, in which the distribution address identifier is sent to the CR router when the first access point and the second access point forward the CR enabling request message; and a CR enabling feedback sending unit configured to send a CR enabling feedback message to the station via the first access point and the second access point, so that the station is capable of sending different data packets of a single session task through the first access point and the second access point separately.

In another aspect, a station includes: an uplink data packet sending unit configured to: for each uplink data packet of a single session task to be sent, select, according to available bandwidth resources allocated to the station by access points associated with a CR of the station, an uplink access point from the access points associated with the CR of the station, and send different uplink data packets to a CR router via the uplink access point, in which the uplink data packet includes a source address and a destination address of the uplink data packet, so that the CR router forwards each uplink data packet to the destination address of the uplink data packet; the destination address of the uplink data packet is a peer end address of the single session task.

A CR router includes: an uplink data packet receiving unit configured to receive each uplink data packet of a single session task, in which the uplink data packet is sent by a station and forwarded via an uplink access point, and the uplink data packet includes a source address and a destination address; the destination address of the uplink data packet is a peer end address of the single session task; and an uplink data packet forwarding unit configured to send the uplink data packet to the destination address of the uplink data packet.

In still another aspect, a CR router includes: a downlink data packet receiving unit configured to receive each downlink data packet of a single session task sent from a destination address, in which the downlink data packet includes the source address; a distribution address identifier seeking unit configured to find a corresponding distribution address identifier according to the source address, in which the distribution address identifier is formed of an address of an access point associated with a CR of a station and a port number that is used for communicating with the station; and a downlink data packet sending unit configured to select a downlink access point according to an available bandwidth resource allocated to the station by the access point associated with the CR of the station and the distribution address identifier, and send the downlink data packet to the downlink access point, in which the downlink data packet is forwarded to the station by the downlink access point.

A station includes: a downlink data packet obtaining unit configured to receive, via a downlink access point, a downlink data packet forwarded by a CR router; and an application unit configured to use the downlink data packet according to a sequence of the downlink data packet.

A system for enabling a routing function includes: a station configured to: when the station uses an external network identifiable address, and performs data transmission of a single session task through a first access point, determine an address of a CR router connected to the first access point; and further configured to determine at least one second access point, in which the second access point and the first access point are connected to the same CR router; the first access point and the second access point are access points associated with the CR of the station, in which the station is further configured to send a CR enabling request message to a CR router corresponding to the CR router address through each of the access points associated with the CR of the station, in which the external network identifiable address used by the station and an available bandwidth resource allocated to the station by an access point forwarding the CR enabling request message are recorded in the CR enabling request message; an access point configured to forward the CR enabling request message of the station to the CR router, in which the access point includes a first access point and at least one second access point; and the CR router configured to receive the CR enabling request message sequentially, in which the CR enabling request message is sent from the station, and forwarded by the first access point and the second access point, in which the CR router is further configured to record correspondence between the external network identifiable address used by the station and a distribution address identifier of each of the first access point and the second access point, so that the CR router selects a downlink access point according to the available bandwidth resource of the access point and the correspondence, in which the distribution address identifier is sent to the CR router when the first access point and the second access point forward the CR enabling request message; and the CR router is further configured to send a CR enabling feedback message to the station via the first access point and the second access point, so that the station is capable of sending different data packets of a single session task through the first access point and the second access point separately.

A system for transmitting data includes: a station configured to: for each uplink data packet of a single session task to be sent, select, according to an available bandwidth resource allocated to the station by access points associated with a CR of the station, an uplink access point from the access points associated with the CR of the station, and send different uplink data packets to a CR router via the uplink access point, in which the uplink data packet includes a source address and a destination address of the uplink data packet, so that the CR router forwards each uplink data packet to the destination address of the uplink data packet; the destination address of the uplink data packet is a peer end address of the single session task; the uplink access point configured to send the uplink data packet sent by the station to the CR router; the CR router configured to receive each uplink data packet of the single session task, and send the uplink data packet to the destination address of the uplink data packet, in which the uplink data packet is sent by the station and forwarded via the uplink access point, in which the CR router is further configured to receive each downlink data packet of a single session task sent from a source address of a downlink data packet, in which the downlink data packet includes a destination address of the downlink data packet; the CR router is further configured to find a corresponding distribution address identifier according to the destination address of the downlink data packet, in which the distribution address identifier is formed of an address of the access point associated with the CR of the station and a port number that is used for communicating with the station; and the CR router is further configured to select a downlink access point according to the available bandwidth resource allocated to the station by the access point associated with the CR of the station and the distribution address identifier, and send the downlink data packet to the downlink access point, in which the downlink data packet is forwarded to the station by the downlink access point; and the downlink access point configured to forward the downlink data packet to the station, in which the station is further configured to: after receiving the downlink data packet, use the downlink data packet according to a sequence of the downlink data packet.

The embodiments of the present invention provide a method, a device and a system for enabling a routing function and transmitting data. An access point associated with a CR of a station is obtained, a CR enabling request message is sent to a router, and a CR enabling feedback message returned by the router is received, so as to implement enabling of the CR routing function, so that in subsequent data transmission, data packets of a single session task are transmitted through different access points associated with the CR of the station, and therefore, data sharing is implemented in both uplink and downlink directions, thereby improving data transmission quality.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
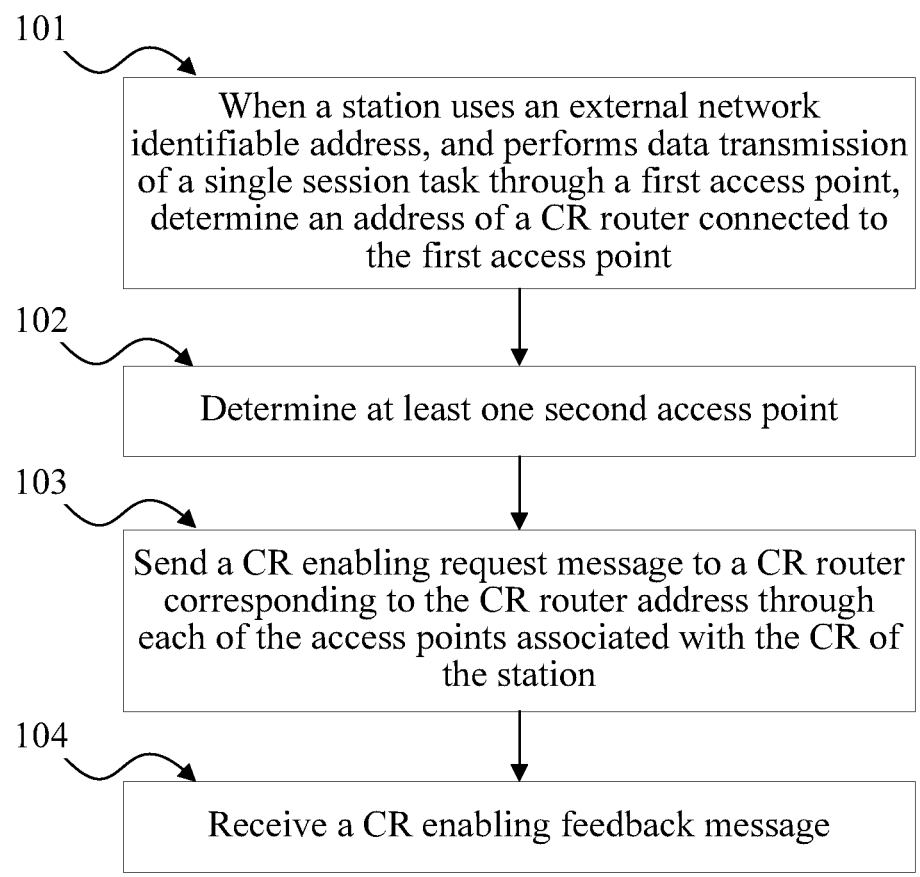
FIG. 1 is a flow chart of a method for enabling a routing function at the station side provided in Embodiment 1 of the present invention.

The embodiment of the present invention provides a method for enabling a routing function, to make a station to determine an access point associated with a CR thereof, and to enable the CR function. As shown in FIG. 1, the method relates to the station side, and includes the following steps:

Step 101: When a station uses an external network identifiable address, and performs data transmission of a single session task through a first access point, determine an address of a CR router connected to the first access point.

Before enabling the CR function, the station performs data transmission of the single session task through an access point (namely, the first access point). Under this situation, the station uses an external network identifiable address to transmit data, and the address of the router through which data is transmitted is unknown for the station.

When the first access point is not sufficient enough to support the transmission of the single session task, step 101 is executed.

The router connected to the first access point in step 101 is referred to as a CR router.

Step 102: Determine at least one second access point.

The second access point and the first access point are connected to the same CR router.

The first access point and the second access point are access points associated with the CR of the station.

Step 103: Send a CR enabling request message to a CR router corresponding to the CR router address through each of the access points associated with the CR of the station.

The external network identifiable address used by the station and an available bandwidth resource allocated to the station by an access point forwarding the CR enabling request message are recorded in the CR enabling request message.

Step 104: Receive a CR enabling feedback message.

The CR enabling feedback message is returned by the CR router and forwarded via the access points associated with the CR of the station.

After step 104 is completed, the station can send different data packets of the single session task through the first access point and the second access point separately. In an actual situation, a CR enabling request message may not be sent by the station synchronously through the first access point and the second access point separately enabling, and a CR enabling feedback message may not be received by the station through the first access point and the second access point simultaneously, that is, such operations may occur at different times. For example, a CR enabling feedback message forwarded via a second access point A and returned by the CR router is firstly received, and at this time, the station can transmit a data packet through the second access point A. Later, after the station receives a CR enabling feedback message forwarded by another access point (such as the first access point or a second access point B), the station can balance different data packets of the single session task to different access points (the first access point, the second access point A and the second access point B) to perform transmission.

Figure 2:
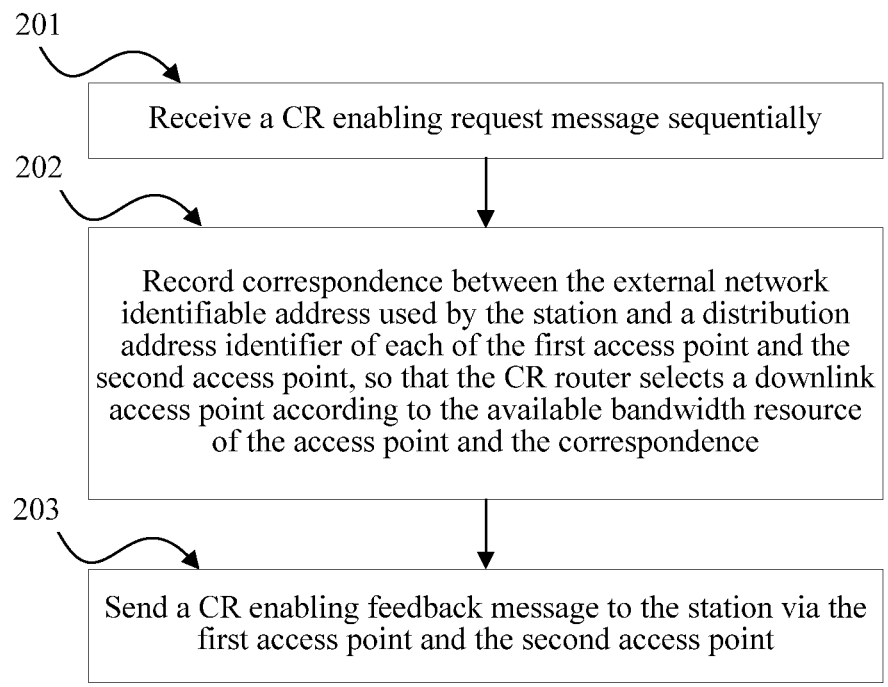
FIG. 2 is a flow chart of a method for enabling a routing function at a side of a router provided in Embodiment 1 of the present invention.

The embodiment of the present invention further provides a method for enabling a routing function, and as shown in FIG. 2, the method relates to a side of a router, and includes the following steps:

Step 201: Receive a CR enabling request message sequentially.

The CR enabling request message is sent from the station and forwarded by the first access point and the second access point.

The external network identifiable address used by the station and an available bandwidth resource allocated to the station by an access point forwarding the CR enabling request message are recorded in the CR enabling request message. The first access point and the second access point are access points associated with the CR of the station.

Step 202: Record correspondence between the external network identifiable address used by the station and a distribution address identifier of each of the first access point and the second access point, so that the CR router selects a downlink access point according to the available bandwidth resource of the access point and the correspondence.

The distribution address identifier is sent to the CR router when the first access point and the second access point forward the CR enabling request message.

Step 203: Send a CR enabling feedback message to the station via the first access point and the second access point.

The embodiment of the present invention provides a method for enabling a routing function. An access point associated with a CR of a station is obtained, a CR enabling request message is sent to a CR router, and a CR enabling feedback message returned by the CR router is received, so as to implement enabling of the CR routing function, so that in subsequent data transmission, data packets of a single session task are transmitted through different access points associated with the CR of the station.

Through the foregoing method for enabling a routing function, the CR function between the station and the CR router is already enabled, and the CR router also obtains an available bandwidth resource of an access point and correspondence between an external network identifiable address used by the station and a distribution address identifier of the access point associated with the CR of the station, so as to be ready for data transmission.

In another aspect, the embodiment of the present invention further provides a method for transmitting data, which relates to the station side, and the method is:

For each uplink data packet of a single session task to be sent, selecting, according to available bandwidth resources allocated to the station by access points associated with a CR of the station, an uplink access point from the access points associated with the CR of the station, and sending different uplink data packets to a CR router via the uplink access point.

An uplink data packet is a data packet sent by the station to an external network, and the uplink data packet includes a source address and a destination address of the uplink data packet, so that the CR router forwards each uplink data packet to the destination address of the uplink data packet. The destination address of the uplink data packet is a peer end address of the single session task, namely, an address of the external network receiving the uplink data packet. The source address of the uplink data packet is the external network identifiable address used by the station.

Figure 3:
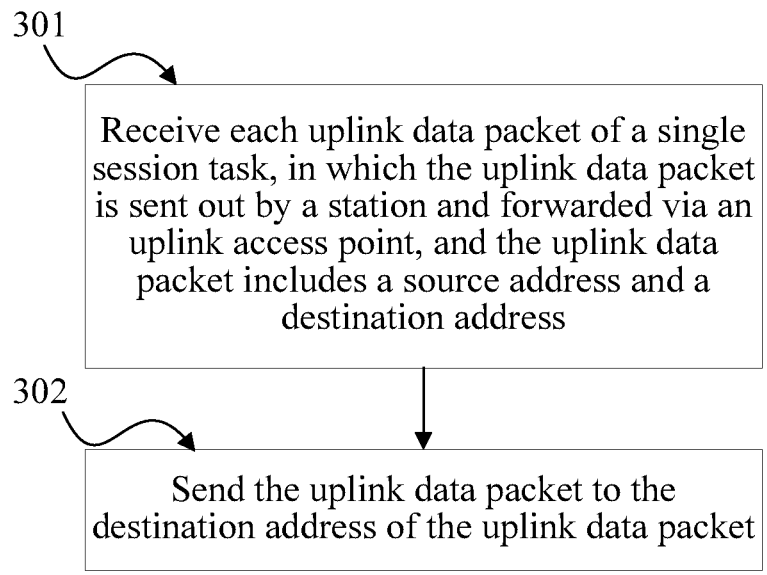
FIG. 3 is a flow chart of a method for transmitting data at a side of a router provided in Embodiment 1 of the present invention.

Relative to the method for sending an uplink data packet at the station side, the embodiment of the present invention further provides a method for transmitting data, which relates to a side of a router, and as shown in FIG. 3, the method includes the following steps:

Step 301: Receive each uplink data packet of a single session task, in which the uplink data packet is sent by a station and forwarded via an uplink access point, and the uplink data packet includes a source address and a destination address.

Step 302: Send the uplink data packet to the destination address of the uplink data packet.

The destination address of the uplink data packet is a peer end address of the single session task, namely, an address of the external network receiving the uplink data packet.

The source address of the uplink data packet is the external network identifiable address used by the station.

Figure 4:
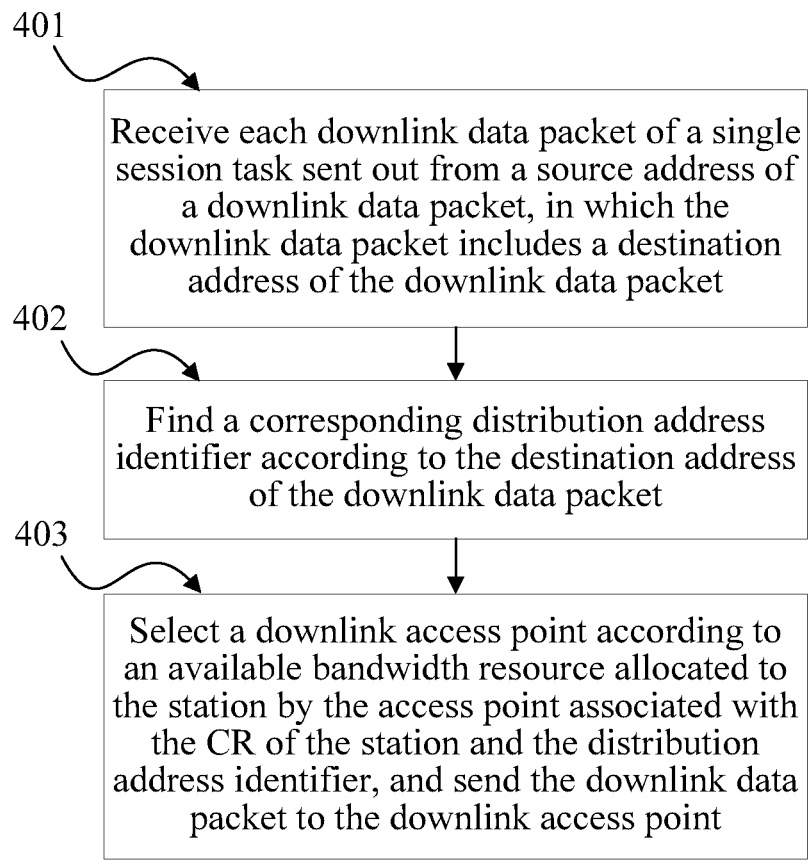
FIG. 4 is a flow chart of another method for transmitting data at a side of a router provided in Embodiment 1 of the present invention.

In still another aspect, the embodiment of the present invention further provides a method for transmitting data, which relates to a side of a router, and as shown in FIG. 4, the method includes the following steps:

Step 401: Receive each downlink data packet of a single session task sent from a source address of a downlink data packet, in which the downlink data packet includes a destination address of the downlink data packet.

The downlink data packet is sent from the address of the external network, and the destination address of the downlink data packet is the external network identifiable address of the station.

Step 402: Find a corresponding distribution address identifier according to the destination address of the downlink data packet.

The distribution address identifier is formed of an address of the access point associated with the CR of the station and a port number that is used for communicating with the station.

Step 403: Select a downlink access point according to an available bandwidth resource allocated to the station by the access point associated with the CR of the station and the distribution address identifier, and send the downlink data packet to the downlink access point.

The downlink access point forwards the received downlink data packet to the station.

In step 403, the downlink access point is selected from the access points (namely, the first access point and the second access point) associated with the CR of the station.

Figure 5:
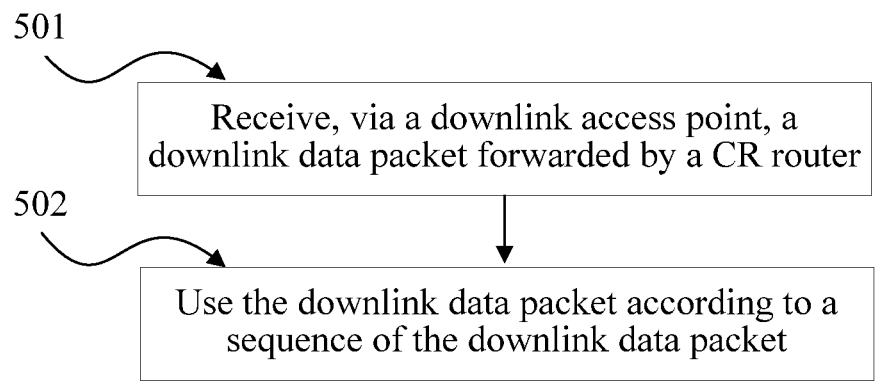
FIG. 5 is a flow chart of a method for transmitting data at the station side provided in Embodiment 1 of the present invention.

Relative to the method for sending a downlink data packet at a side of a router, the embodiment of the present invention further provides a method for transmitting data, which relates to the station side, and as shown in FIG. 5, the method includes the following steps:

Step 501: Receive, via a downlink access point, a downlink data packet forwarded by a CR router.

Step 502: Use the downlink data packet according to a sequence of the downlink data packet.

The embodiment of the present invention provides a method for transmitting data. An uplink access point is selected from access points associated with the CR of the station, the uplink data packet is sent to the CR router via the uplink access point, and the CR router forwards the uplink data packet to the external network, so that the uplink data packet of the single session task is sent via different access points. In another aspect, a downlink access point is selected from the access points associated with the CR of the station, and the downlink data packet of the external network is sent to the station via the downlink access point, so that the downlink data packet of the single session task is sent via different access points. Therefore, data sharing is implemented in both uplink and downlink directions, thereby improving data transmission quality.

Embodiment 2

Figure 6A:
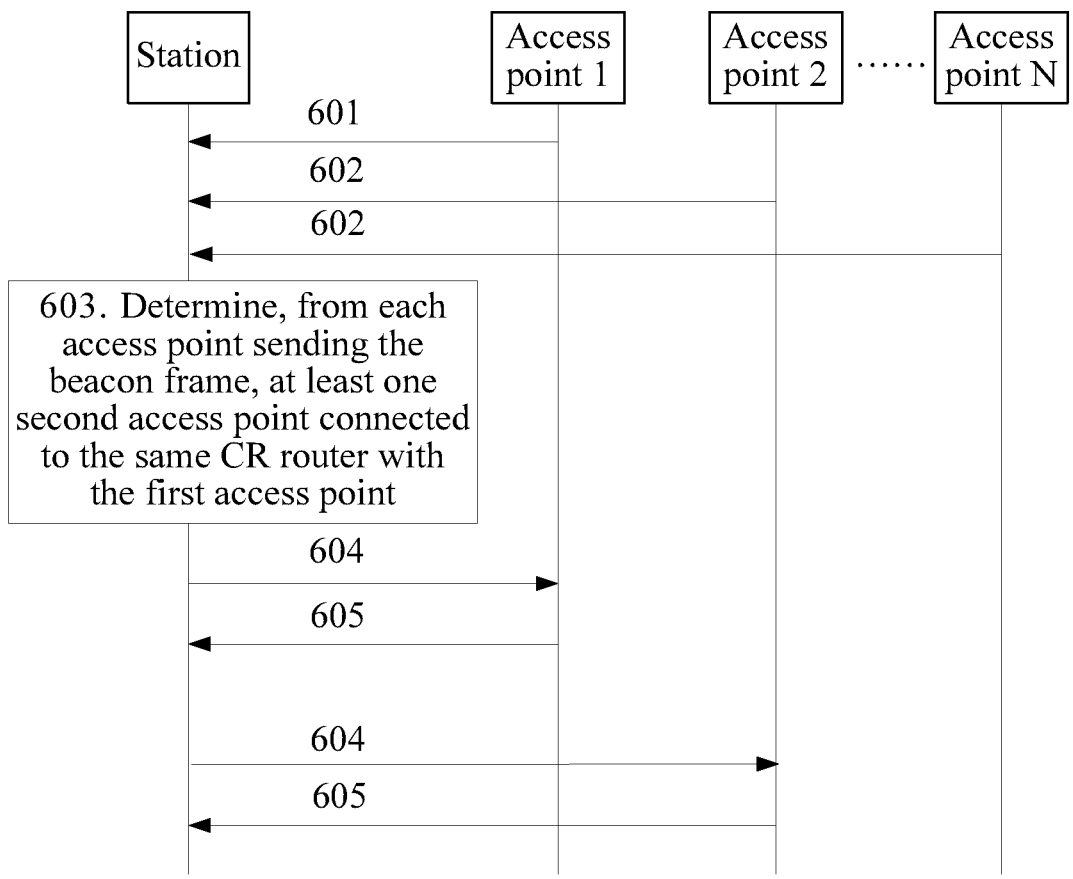
FIG. 6A is a flow chart of a method for enabling a routing function provided in Embodiment 2 of the present invention.

The embodiment of the present invention provides a method for enabling a routing function, and as shown in FIG. 6A, the method includes the following steps:

Step 601: A station receives a beacon frame broadcast by a first access point, in which the beacon frame includes the address of the CR router connected to the first access point.

Step 602: Receive a beacon frame broadcast by each access point except the first access point, in which the beacon frame includes an address of a router connected to a corresponding access point.

Step 603: Determine, from each access point sending the beacon frame, at least one second access point connected to the same CR router with the first access point.

When a second access point is determined, only one second access point can be determined for once, or a plurality of second access points can also be determined for once. The first access point and the second access point are access points associated with the CR of the station.

In FIG. 6A, an access point 1 serves as the first access point, and an access point 2, . . . , and an access point N are used to denote access points except the first access point. Each access point broadcasts a beacon frame.

Step 602 to step 603 are exemplified. As shown in FIG. 6C, a station S1 exists, and it is assumed that a router L1, a router L2 and a router L3 exist, and each router is connected to the external network; an access point A1, an access point A2, an access point A3, an access point A4, an access point A5 and an access point A6 also exist. If L1 is connected to A1, L2 is connected to A2, L3 is connected to A3, A4, A5 and A6, and it is assumed that A3 is the first access point, after receiving the beacon frame broadcast by each access point, the station S1 knows that A4, A5 and A6 are connected to the same router L3 as A3, and at this time, the station S1 can select at least one of A4, A5 and A6 as a second access point. It is assumed that S1 determines A4, A5 and A6 as second access points, and at this time, A3, A4, A5 and A6 all serve as access points associated with the CR of the station S1.

Except obtaining the router address through the beacon frame in step 601, the station can further obtain the CR router address in another manner. For example, the station sends a router address request message to the first access point, and receives a router address feedback message of the first access point, in which the router address feedback message of the first access point carries the address of the CR router connected to the first access point; the station sends a router address request message to each access point connected to the station itself except the first access point separately; the access point receiving the routing address request message returns a router address feedback message to the station, in which the router address feedback message carries an address of a router connected to the access point sending the router address feedback message. After receiving the router address feedback message returned by each access point, the station can determine the second access point with reference to step 602 to step 603. Specifically, the manner in which the station sends the router address request message, and receives the router address feedback message can be: the station sends a probe request frame to an access point, and the access point feeds back a probe response frame; or can further be: a group of frames for querying a router address including a querying request frame and a querying response frame are predefined.

Moreover, the station can further ask for the router address by sending a Dynamic Host Configuration Protocol, dynamic host configuration protocol (DHCP) request to a DHCP server. The DHCP server sends the DHCP feedback carrying the router address to the station, so that the station determines a second access point connected to the same CR router with the first access point. The DHCP server described here is generally integrated on a corresponding access point in a same subnet.

Optionally, after an access point associated with the CR of the station is determined, the association between other access points except the access point associated with the CR of the station and the station is interrupted.

Step 604: The station sends a resource request message to each of the access points associated with the CR of the station.

In FIG. 6A, it is assumed that the access point 2 is determined as a second access point, and the station sends a resource request message to these two access points: the first access point and the second access point.

Step 605: Each of the access points associated with the CR of the station returns a resource feedback message to the station.

An available bandwidth resource allocated to the station by the access points associated with the CR of the station is recorded in the resource feedback message, so that the station selects an access point from the access points associated with the CR to perform data packet transmission according to the available bandwidth resource.

Figure 6B:
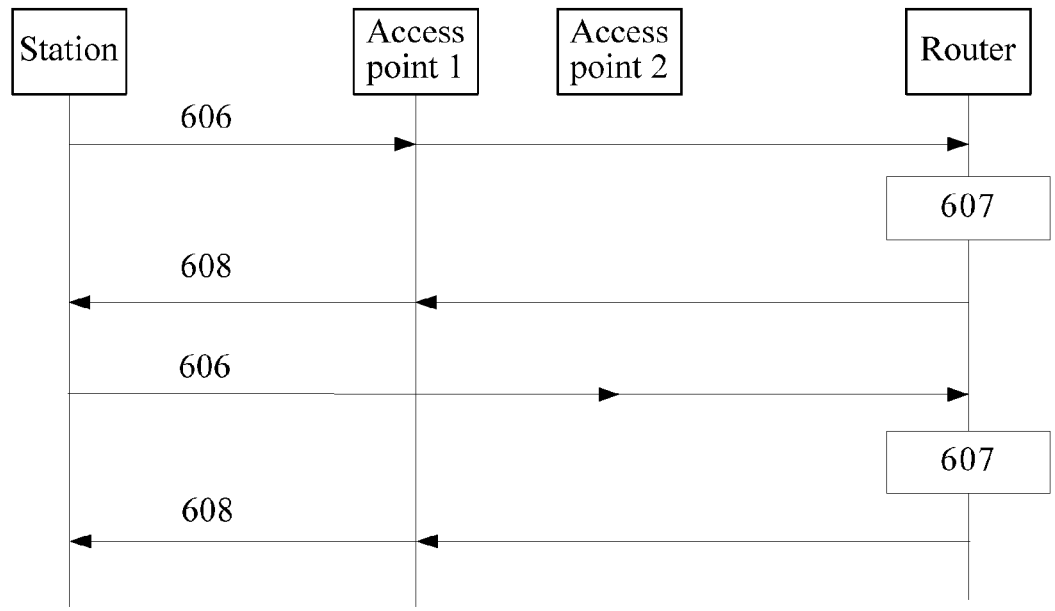
FIG. 6B is a flow chart of further completing enabling of a routing function on the basis of FIG. 6A.
Figure 6C:
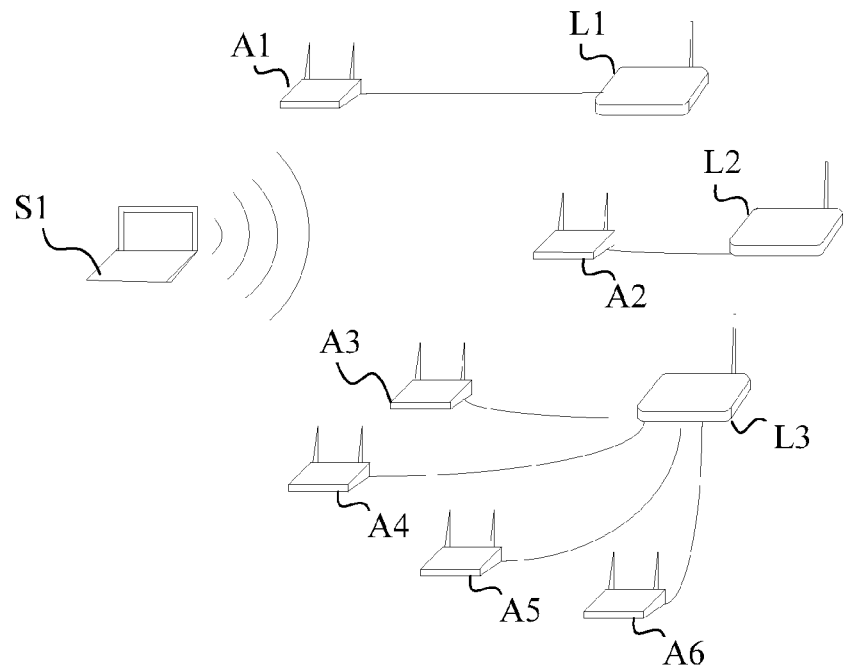
FIG. 6C is a schematic diagram of a scenario provided in Embodiment 2 of the present invention.

After step 605 is completed, as shown in FIG. 6B, the method further includes the following steps:

Step 606: The station sends a CR enabling request message to a CR router corresponding to the CR router address through the access points associated with the CR of the station sequentially.

According to the assumption in FIG. 6A, the access point 1 and the access point 2 serve as the access points associated with the CR of the station.

The external network identifiable address used by the station and an available bandwidth resource allocated to the station by an access point forwarding the CR enabling request message are recorded in the CR enabling request message.

Step 607: The CR router records correspondence between the external network identifiable address used by the station and a distribution address identifier of each of the first access point and the second access point.

After the available bandwidth resource of the first access point and the second access point is obtained and the correspondence is recorded, so that the CR router selects a downlink access point according to the available bandwidth resource of the access points and the correspondence. The distribution address identifier is sent to the CR router when the access points forward the CR enabling request message.

Optionally, quality of service (QoS) information of the station is further recorded in the CR enabling request message, and the QoS information can also be used as the basis on which the CR router selects the downlink access point.

Step 608: The CR router sends a CR enabling feedback message, which is forwarded to the station via the access points associated with the CR of the station.

So far, the routing function enabling is completed. The station can send different data packets of the single session task through the first access point and the second access point separately.

It should be noted that, in FIG. 6B, the action in which the CR router records correspondence between the external network identifiable address used by the station and a distribution address identifier of each of the first access point and the second access point can be executed for once after the CR enabling feedback message of the access point 1 and the access point 2 is completed.

The embodiment of the present invention provides a method for enabling a routing function. In one aspect, the station obtains the address of the CR router, determines an access point associated with the CR of the station, sends the CR enabling request message to the CR router through the access point associated with the CR of the station, and receives the CR enabling feedback message returned by the CR router, so as to implement enabling of the CR routing function. In the other aspect, the CR router also obtains the available bandwidth resource allocated to the station by the access point, and records correspondence between the external network identifiable address used by the station and a distribution address identifier of each of the first access point and the second access point, so that in data transmission among the station, the access point, the CR router, and the external network, and the data packets of a single session task are transmitted through different access points associated with the CR of the station.

Embodiment 3

Figure 7:
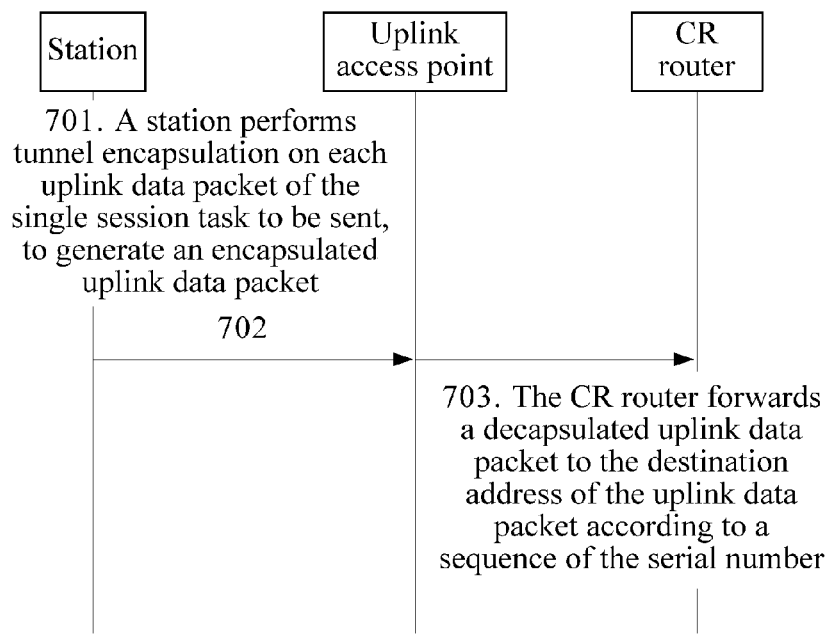
FIG. 7 is a flow chart of a method for transmitting data provided in Embodiment 3 of the present invention.

After the foregoing routing function enabling is implemented, the embodiment of the present invention provides a method for transmitting data, which relates to an uplink direction, and as shown in FIG. 7, the method includes the following steps:

Step 701: A station performs tunnel encapsulation on each uplink data packet of the single session task to be sent, to generate an encapsulated uplink data packet.

The uplink data packet includes a source address and a destination address of the uplink data packet. Specifically, the source address of the uplink data packet is an external network identifiable address of the station, and the destination address of the uplink data packet is a peer end address of the single session task, namely, an address of an external network receiving the uplink data packet.

A tunnel header of the tunnel encapsulation includes a serial number of the current uplink data packet, so that the CR router forwards each uplink data packet to the destination address of the uplink data packet according to a sequence of the serial number. The tunnel header of the tunnel encapsulation further includes an address of the CR router used as a tunnel destination address, so that the access point forwards the uplink data packet to the CR router.

Figure 8A:
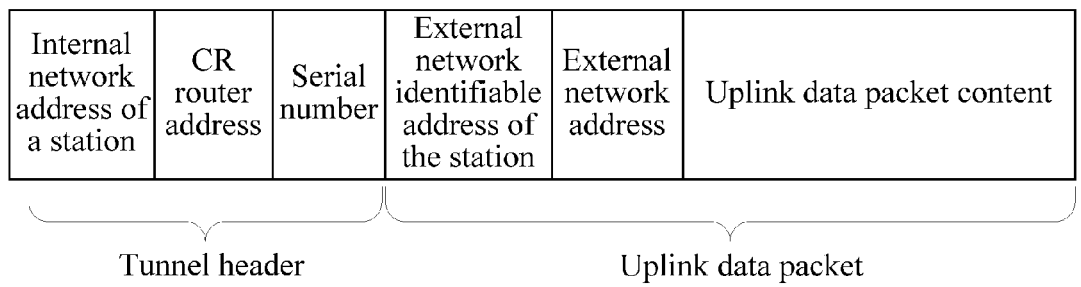
FIG. 8A is a schematic diagram of an encapsulated uplink data packet in Embodiment 3 of the present invention.

In FIG. 8A, a structure of the encapsulated uplink data packet is illustrated.

The tunnel header of FIG. 8A includes an internal network address of the station, a CR router address and a serial number. The internal network address of the station refers to an Internet Protocol (IP) address obtained by the station from the DHCP server through an access point connected to the station, the internal network address is used by the station at the time of sending the data to the access point in the internal network, and each internal network address is corresponding to a unique access point. The CR router address is a tunnel destination address, and the serial number indicates a sequence of each uplink data packet. The uplink data packet includes the external network identifiable address of the station, the external network address and the uplink data packet content.

Step 702: Send different encapsulated uplink data packets to the CR router via an uplink access point.

A manner of selecting an uplink access point is: selecting an access point capable of satisfying the data transmission requirement as an uplink access point according to the available bandwidth resource allocated to the station by the access point associated with the CR of the station.

Step 703: The CR router forwards a decapsulated uplink data packet to the destination address of the uplink data packet according to a sequence of the serial number.

Figure 9:
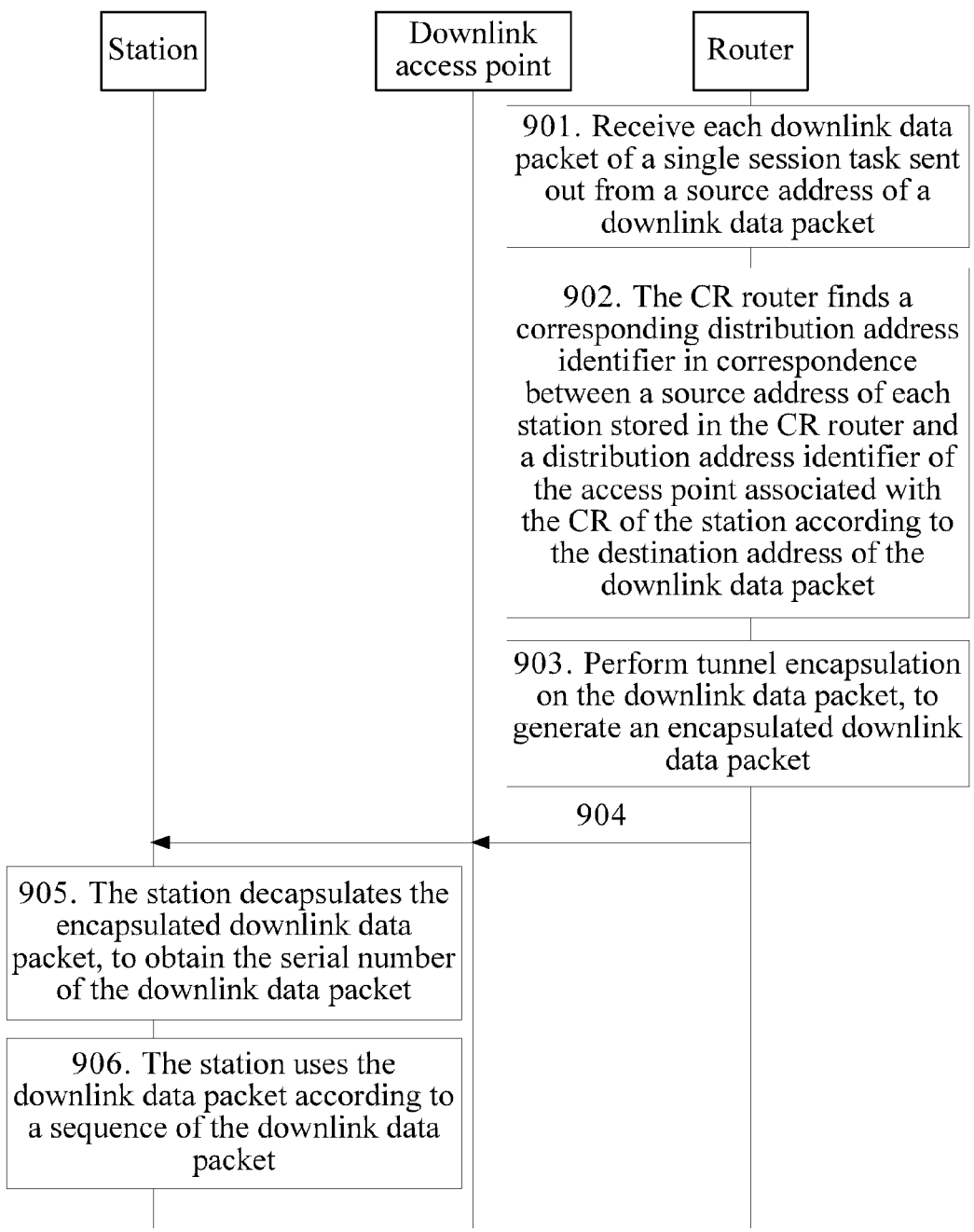
FIG. 9 is a flow chart of another method for transmitting data provided in Embodiment 3 of the present invention.

In another aspect, the embodiment of the present invention further provides a method for transmitting data, which relates to a downlink direction, and as shown in FIG. 9, the method includes the following steps:

Step 901: Receive each downlink data packet of a single session task sent from a source address of a downlink data packet.

The downlink data packet includes a destination address of the downlink data packet. Here, the destination address of the downlink data packet is used as the external network identifiable address of the source address of the station.

Step 902: The CR router finds a corresponding distribution address identifier in correspondence between an external network identifiable address used by the station and stored in the CR router and a distribution address identifier of the access point associated with the CR of the station according to the destination address of the downlink data packet.

Step 903: Perform tunnel encapsulation on the downlink data packet, to generate an encapsulated downlink data packet.

A tunnel header of the tunnel encapsulation includes a serial number used for denoting a receiving sequence of the downlink data packet, a CR router address used as a tunnel source address, and a distribution address identifier used as a tunnel destination address.

Figure 8B:
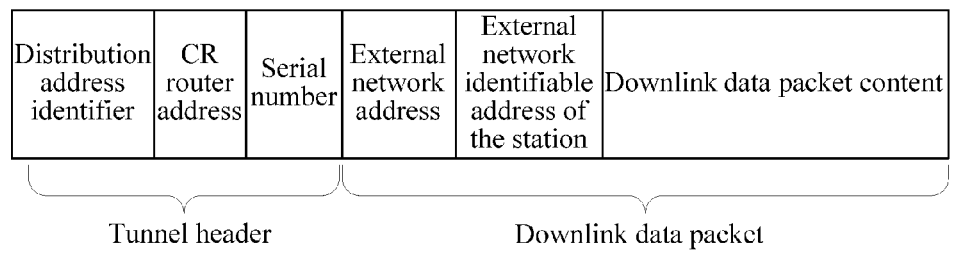
FIG. 8B is a schematic diagram of an encapsulated downlink data packet in Embodiment 3 of the present invention.

In FIG. 8B, a structure of the encapsulated downlink data packet is illustrated.

The tunnel header of FIG. 8B includes a distribution address identifier, a CR router address and a serial number. The downlink data packet includes the external network address, the external network identifiable address of the station, and the downlink data packet content. The distribution address identifier is formed of an address of the access point associated with the CR of the station and a port number that is used for communicating with the station. The distribution address identifier indicates an access point to which the encapsulated downlink data packet sent by the CR router points, and indicates a port of the access point which communicates with the station. After receiving the encapsulated downlink data packet, the access point forwards the encapsulated downlink data packet to the station through the port number recorded in the distribution address identifier.

Step 904: The CR router sends the encapsulated downlink data packet to the station via the downlink access point.

A manner in which a router selects a downlink access point is: selecting a downlink access point according to the available bandwidth resource of the access point and the correspondence. Moreover, QoS information of the station is further recorded in the CR enabling request message, and the QoS information can also be used as the basis on which the CR router selects the downlink access point. For example, currently 5 access points associated with the CR of the station exist, the external network identifiable address of the station is A1, and distribution address identifiers of the five access points are A2, A3, A4, A5 and A6 separately. Correspondence exists between A1 and A2, A3, A4, A5 as well as A6. When selecting a downlink access point, the router chooses from the access points corresponding to A2, A3, A4, A5 and A6. With reference to an available bandwidth resource of each access point, and the QoS information, one or more access points capable of satisfying the transmission quality requirement is selected from the 5 access points as a downlink access point.

A plurality of access points is selected as downlink access points to transmit data for the single session task, the bandwidth which can be provided is greater than the bandwidth of an access point, and additionally, a downlink data packet is encapsulated with a serial number, so that when the downlink data packet reaches the station through different downlink access points out of order, the correct sequence can be restored again and be used by the station conveniently. Similarly, when a plurality of uplink access points transmits data for a single session task, the bandwidth which can be provided by the uplink access points is also greater than bandwidth of an access point, and an uplink data packet is encapsulated with a serial number, so that when the uplink data packet reaches the CR router through different uplink access points out of order, the CR router can restore the normal sequence again according to the serial number and send the uplink data packet to the external network.

A user datagram protocol (UDP) data packet itself has no serial number, and cannot identify a sequence of each UDP data packet, so the data packet receiving sequence can be ensured by adding a serial number into tunnel encapsulation. A transmission control protocol (TCP) data packet carries its own serial number, so for the TCP data packet, tunnel encapsulation may not be performed, and it is unnecessary to add a serial number; no matter whether it is an external network device or a station, the external network device or the station can use the TCP data packet in sequence according to the serial number carried in the TCP data packet itself.

It should be pointed out that, after receiving a downlink data packet, the CR router can firstly encapsulate a serial number and then select a downlink access point, or can also firstly select a downlink access point, and then encapsulate each downlink data packet through a serial number, and the embodiment of the present invention is not limited thereto.

Step 905: The station decapsulates the encapsulated downlink data packet, to obtain the serial number of the downlink data packet.

Step 906: The station uses the downlink data packet according to a sequence of the downlink data packet.

The embodiment of the present invention provides a method for transmitting data, where after a data packet is encapsulated with a serial number, an access point is selected according to an available bandwidth resource allocated by the access point for the station to transmit data, so that data traffic of a single session task is balanced to different access points and transmitted, thereby implementing data distribution under a situation that bandwidth of a single access point is limited, and ensuring communication quality.

Embodiment 4

Figure 10:
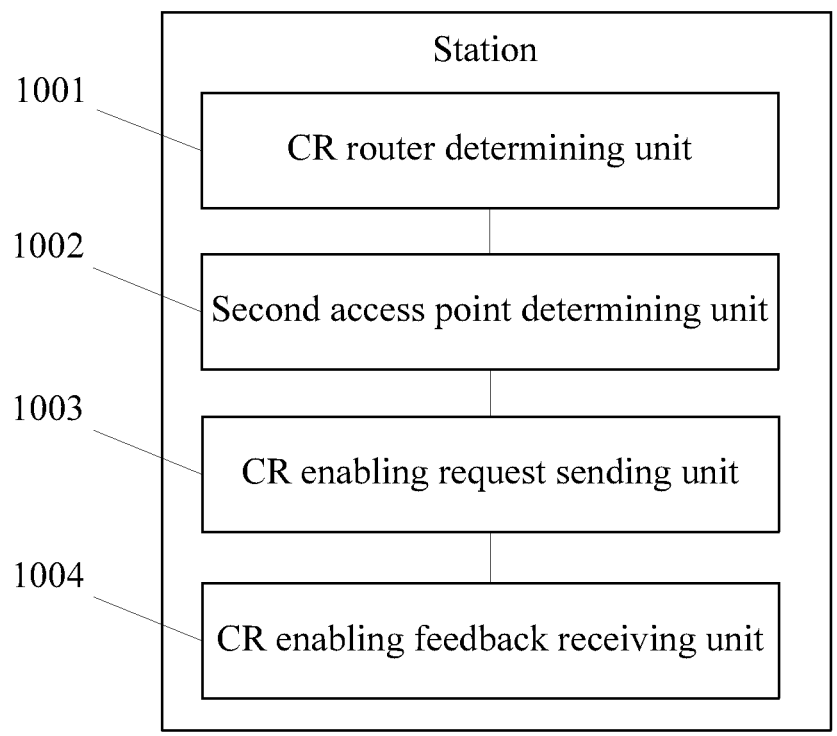
FIG. 10 is a block diagram of a station provided in Embodiment 4 of the present invention.

In order to implement the enabling of a CR function, the embodiment of the present invention provides a station, and as shown in FIG. 10, the station includes: a CR router determining unit 1001, a second access point determining unit 1002, a CR enabling request sending unit 1003, and a CR enabling feedback receiving unit 1004.

The CR router determining unit 1001 is configured to: when a station uses an external network identifiable address, and performs data transmission of a single session task through a first access point, determine an address of a CR router connected to the first access point.

The second access point determining unit 1002 is configured to determine at least one second access point, in which the second access point and the first access point are connected to the same CR router; the first access point and the second access point are access points associated with the CR of the station.

The CR enabling request sending unit 1003 is configured to send a CR enabling request message to a CR router corresponding to the CR router address through each of the access points associated with the CR of the station, in which the external network identifiable address used by the station and an available bandwidth resource allocated to the station by an access point forwarding the CR enabling request message are recorded in the CR enabling request message.

The CR enabling feedback receiving unit 1004 is configured to receive a CR enabling feedback message, in which the CR enabling feedback message is returned by the CR router and forwarded via the access points associated with the CR of the station, so that the station sends different data packets of the single session task through the first access point and the second access point separately.

Figure 11:
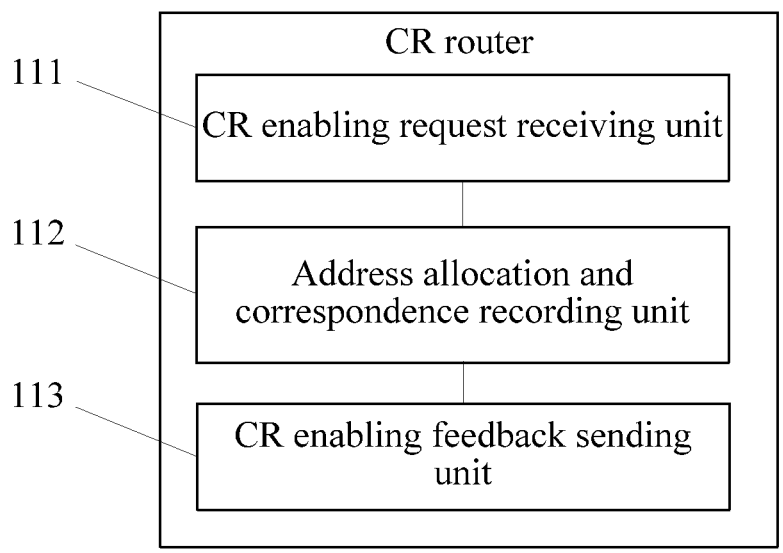
FIG. 11 is a block diagram of a CR router provided in Embodiment 4 of the present invention.

In another aspect, the embodiment of the present invention further provides a CR router, and as shown in FIG. 11, the router includes: a CR enabling request receiving unit 111, address allocation and correspondence recording unit 112, and a CR enabling feedback sending unit 113.

The CR enabling request receiving unit 111 is configured to receive a CR enabling request message sequentially, in which the CR enabling request message is sent from the station and forwarded by a first access point and a second access point, and an external network identifiable address used by the station and an available bandwidth resource allocated to the station by an access point forwarding the CR enabling request message are recorded in the CR enabling request message; the first access point and the second access point are access points associated with the CR of the station.

The address allocation and correspondence recording unit 112 is configured to record correspondence between the external network identifiable address used by the station and a distribution address identifier of each of the first access point and the second access point, so that the CR router selects a downlink access point according to the available bandwidth resource of the access point and the correspondence, in which the distribution address identifier is sent to the CR router when the first access point and the second access point forward the CR enabling request message.

The CR enabling feedback sending unit 113 is configured to send a CR enabling feedback message to the station via the first access point and the second access point, so that the station is capable of sending different data packets of a single session task through the first access point and the second access point separately.

Figure 12:
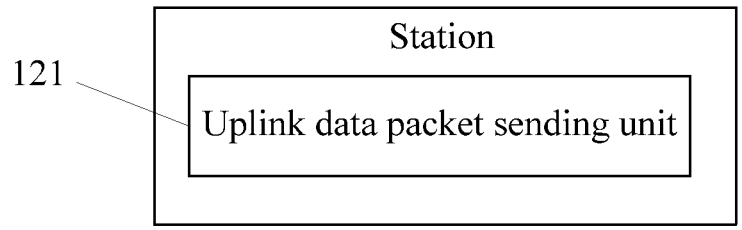
FIG. 12 is a block diagram of another station provided in Embodiment 4 of the present invention.

The embodiment of the present invention further provides a station, and as shown in FIG. 12, the station includes: an uplink data packet sending unit 121 configured to: for each uplink data packet of a single session task to be sent, select, according to available bandwidth resources allocated to the station by access points associated with a CR of the station, an uplink access point from the access points associated with the CR of the station, and send different uplink data packets to a CR router via the uplink access point.

The uplink data packet includes a source address and a destination address of the uplink data packet, so that the CR router forwards each uplink data packet to the destination address of the uplink data packet. The destination address of the uplink data packet is a peer end address of the single session task.

Figure 13:
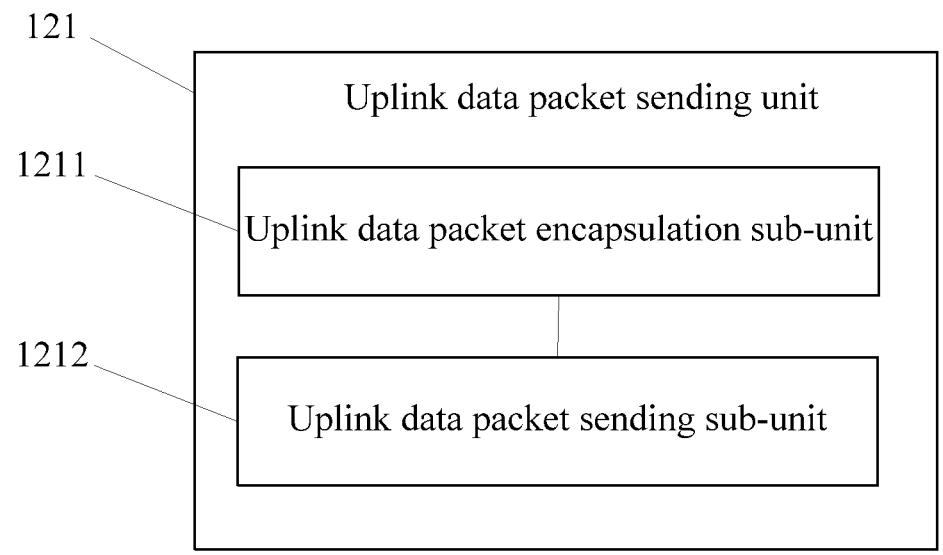
FIG. 13 is a block diagram of an uplink data packet sending unit in Embodiment 4 of the present invention.

Further, as shown in FIG. 13, the uplink data packet sending unit 121 specifically includes: an uplink data packet encapsulation sub-unit 1211, and an uplink data packet sending sub-unit 1212.

The uplink data packet encapsulation sub-unit 1211 is configured to perform tunnel encapsulation on each uplink data packet of the single session task to be sent, to generate the encapsulated uplink data packet. A tunnel header of the tunnel encapsulation includes the serial number of current uplink data packets, so that the CR router forwards the each uplink data packet to the destination address according to a sequence of the serial numbers; the tunnel header of the tunnel encapsulation includes an address of the CR router as a tunnel destination address.

The uplink data packet sending sub-unit 1212 is configured to send different encapsulated uplink data packets to the CR router via the uplink access point.

Figure 14:
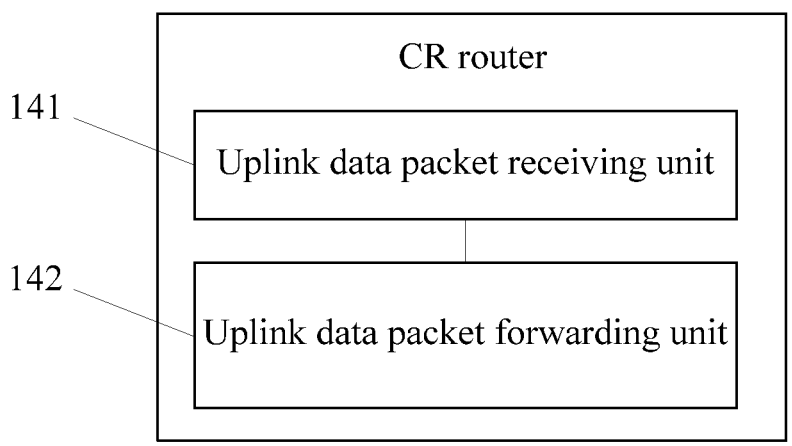
FIG. 14 is a block diagram of another router provided in Embodiment 4 of the present invention.

The embodiment of the present invention further provides a CR router, and as shown in FIG. 14, the router includes an uplink data packet receiving unit 141, and an uplink data packet forwarding unit 142.

The uplink data packet receiving unit 141 is configured to receive each uplink data packet of a single session task, in which the uplink data packet is sent by a station and forwarded via an uplink access point, and the uplink data packet includes a source address and a destination address; the destination address of the uplink data packet is a peer end address of the single session task.

The uplink data packet forwarding unit 142 is configured to send the uplink data packet to the destination address of the uplink data packet.

Figure 15:
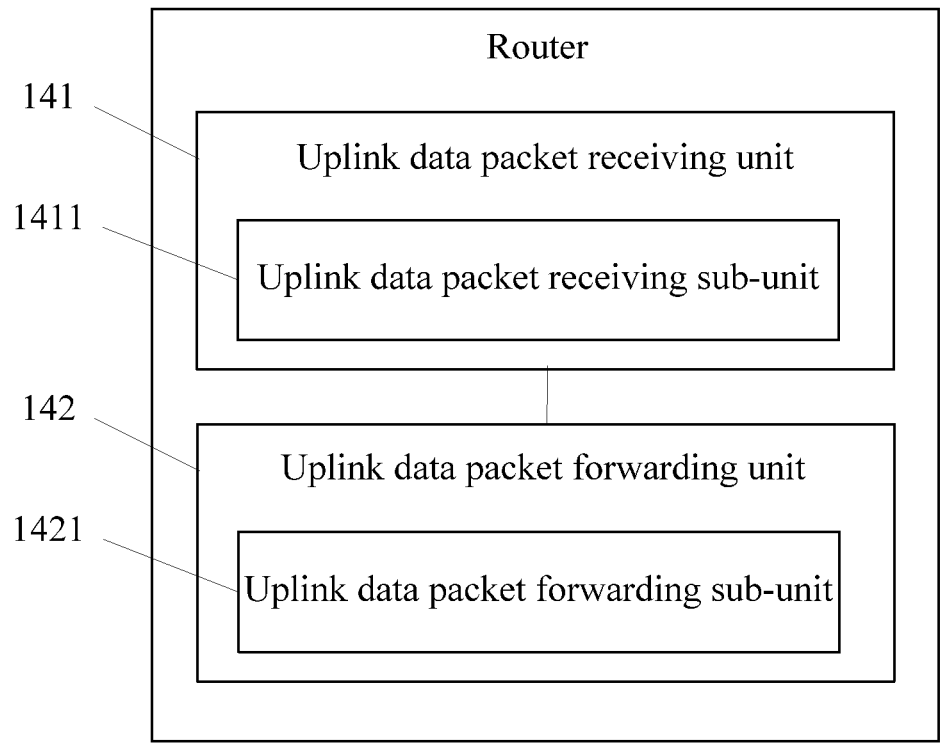
FIG. 15 is a block diagram of an uplink data packet receiving unit in Embodiment 4 of the present invention.

Further, as shown in FIG. 15, the uplink data packet receiving unit 141 specifically includes: an uplink data packet receiving sub-unit 1411 configured to receive an encapsulated uplink data packet. The encapsulated uplink data packet is formed after the station performs tunnel encapsulation on each uplink data packet of the single session task, and forwarded via the uplink access point.

A tunnel header of the tunnel encapsulation includes a distribution address identifier and a serial number of the current uplink data packet. The uplink access point is selected and obtained by the station according to an available bandwidth resource allocated to the access point by an access point associated with a CR of the station; the distribution address identifier is formed of an address of the access point associated with the CR of the station and a port number that is used for communicating with the station; the tunnel header of the tunnel encapsulation includes an address of the CR router as a tunnel destination address.

The uplink data packet forwarding unit 142 specifically includes: an uplink data packet forwarding sub-unit 1421 configured to forward a decapsulated uplink data packet to the destination address of the uplink data packet according to a sequence of the serial number.

Figure 16:
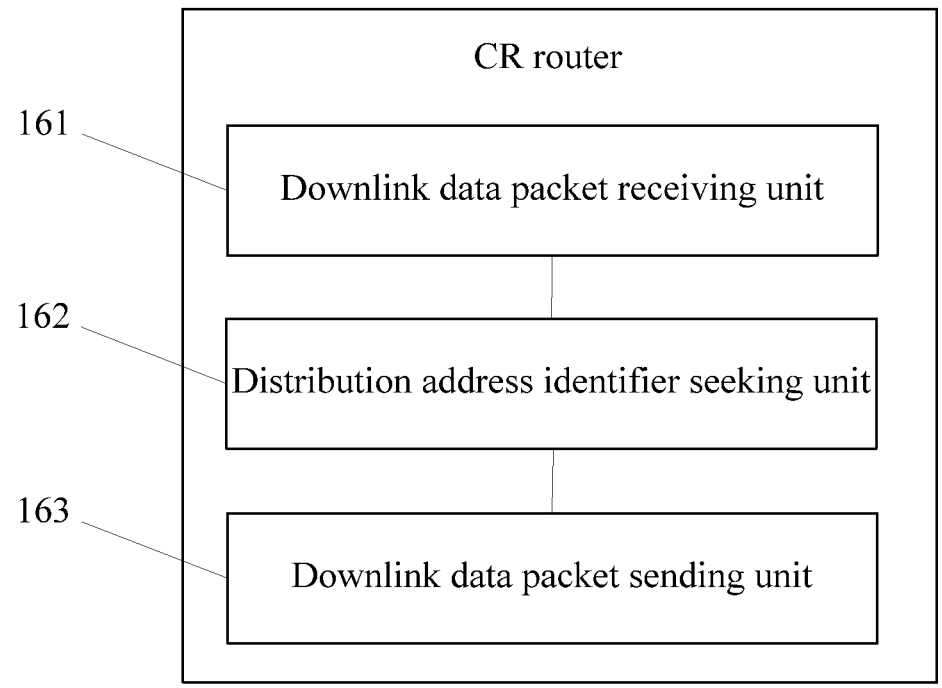
FIG. 16 is a block diagram of still another CR router provided in Embodiment 4 of the present invention.

In still another aspect, the embodiment of the present invention further provides a CR router, and as shown in FIG. 16, the CR router includes: a downlink data packet receiving unit 161, a distribution address identifier seeking unit 162, and a downlink data packet sending unit 163.

The downlink data packet receiving unit 161 is configured to receive each downlink data packet of a single session task sent from a destination address, in which the downlink data packet includes the destination address of the downlink data packet.

The distribution address identifier seeking unit 162 is configured to find a corresponding distribution address identifier according to the destination address of the downlink data packet, in which the distribution address identifier is formed of an address of an access point associated with a CR of a station and a port number that is used for communicating with the station.

The downlink data packet sending unit 163 is configured to select a downlink access point according to an available bandwidth resource allocated to the station by the access point associated with the CR of the station and the distribution address identifier, and send the downlink data packet to the downlink access point, in which the downlink data packet is forwarded to the station by the downlink access point.

Figure 17:
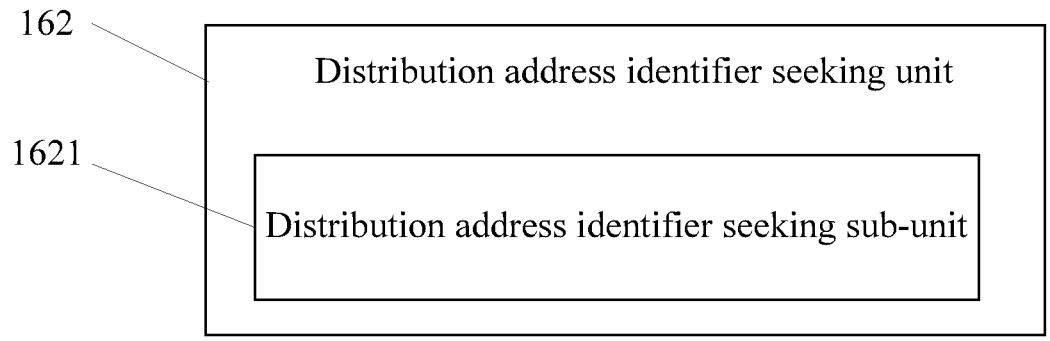
FIG. 17 is a block diagram of a distribution address identifier seeking unit in Embodiment 4 of the present invention.

Further, as shown in FIG. 17, the distribution address identifier seeking unit 162 specifically includes: a distribution address identifier seeking sub-unit 1621 configured to find a corresponding distribution address identifier in correspondence between the source address of each station stored in a router and a distribution address identifier of the access point associated with the CR of the station according to the destination address of the downlink data packet.

Figure 18:
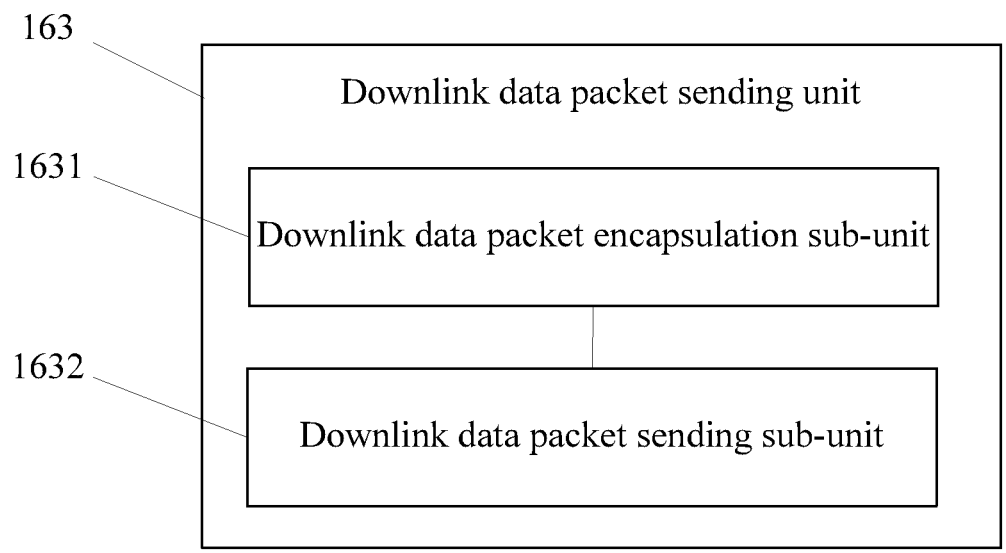
FIG. 18 is a block diagram of a downlink data packet sending unit in Embodiment 4 of the present invention.

Further, as shown in FIG. 18, the downlink data packet sending unit 163 specifically includes: a downlink data packet encapsulation sub-unit 1631 configured to perform tunnel encapsulation on the downlink data packet, to generate an encapsulated downlink data packet, in which a tunnel header of the tunnel encapsulation includes a serial number used for denoting a receiving sequence of the downlink data packet, a CR router address used as a tunnel source address, and a distribution address identifier used as a tunnel destination address; and a downlink data packet sending sub-unit 1632 configured to send the encapsulated downlink data packet to the downlink access point.

Figure 19:
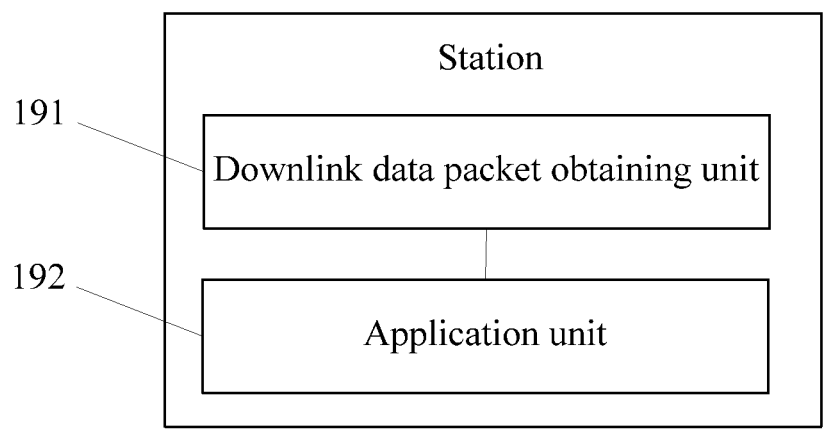
FIG. 19 is a block diagram of still another station provided in Embodiment 4 of the present invention.

The embodiment of the present invention further provides a station, and as shown in FIG. 19, the station includes: a downlink data packet obtaining unit 191, and an application unit 192.

The downlink data packet obtaining unit 191 is configured to receive, via a downlink access point, a downlink data packet forwarded by a CR router.

The application unit 192 is configured to use the downlink data packet according to a sequence of the downlink data packet.

Figure 20:
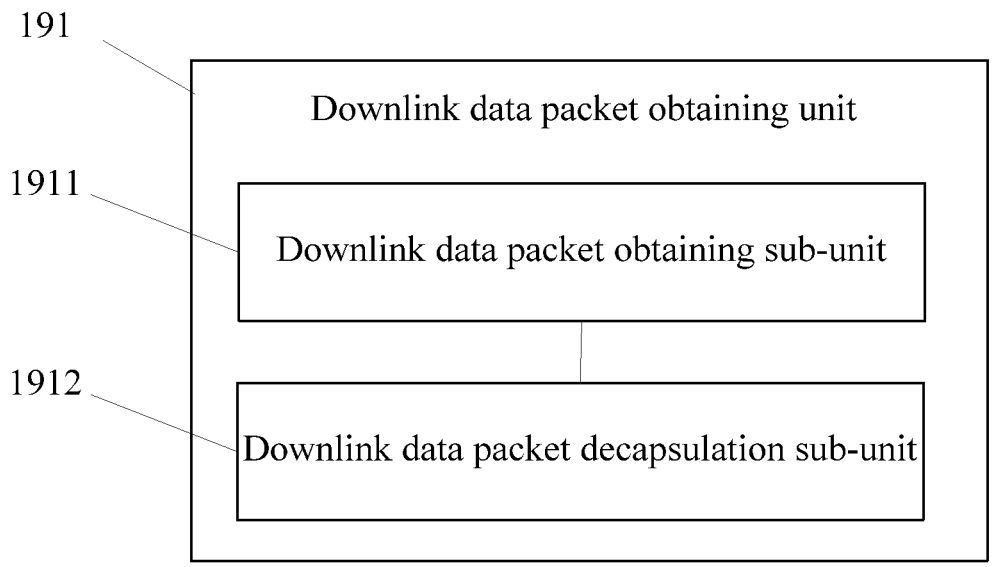
FIG. 20 is a block diagram of a downlink data packet obtaining unit in Embodiment 4 of the present invention.

Further, as shown in FIG. 20, the downlink data packet obtaining unit 191 specifically includes: a downlink data packet obtaining sub-unit 1911, and a downlink data packet decapsulation sub-unit 1912.

The downlink data packet obtaining sub-unit 1911 is configured to receive, via a downlink access point, an encapsulated downlink data packet forwarded by the CR router.

The encapsulated downlink data packet is generated by the CR router by performing tunnel encapsulation on the downlink data packet, in which a tunnel header of the tunnel encapsulation includes a serial number used for denoting a receiving sequence of the downlink data packet, a CR router address used as a tunnel source address, and a distribution address identifier used as a tunnel destination address.

The downlink data packet decapsulation sub-unit 1912 is configured to decapsulate the encapsulated downlink data packet, to obtain a serial number of the downlink data packet, so that the station uses the downlink data packet according to a sequence of the serial numbers of the downlink data packet.

In an actual application, the station mentioned in the embodiment of the present invention should be integrated with a CR enabling function, an uplink data packet encapsulation and transmission function, and a downlink data packet receiving function simultaneously; the CR router mentioned in the embodiment of the present invention should be integrated with a CR enabling function, a function of receiving an uplink data packet and sending the uplink data packet to an external network, and a downlink data packet receiving, encapsulation and forwarding function simultaneously.

The embodiment of the present invention provides a station and a CR router. An access point associated with a CR of a station is obtained, a CR enabling request message is sent to a CR router, and a CR enabling feedback message returned by the router is received, so as to implement enabling of the CR routing function, so that in subsequent data transmission, data packets of a single session task are transmitted through different access points associated with the CR of the station. In another aspect, according to the station and the CR router provided in the embodiment of the present invention, after the CR routing function is enabled, a data packet is encapsulated with a serial number, an access point is selected according to an available bandwidth resource allocated by the access point for the station to transmit data, so that data traffic of a single session task is balanced to different access points and transmitted, thereby implementing data distribution under a situation that bandwidth of a single access point is limited, and ensuring communication quality.

Embodiment 5

Figure 21:
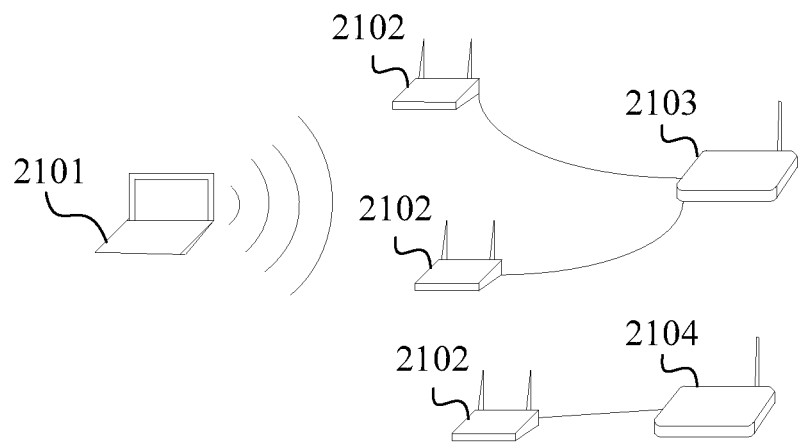
FIG. 21 is a schematic diagram of a system for enabling a routing function provided in Embodiment 5 of the present invention.

The embodiment of the present invention provides a system for enabling a routing function, and as shown in FIG. 21, the system includes a station 2101, an access point 2102 and a CR router 2103.

Before the routing function of the embodiment of the present invention is enabled, the station 2101 transmits data of a single session task via the router 2103 through a first access point by use of an external network identifiable address. When the routing function is enabled, the station 2101 firstly needs to determine an address of the router 2103 connected to the first access point. Here, the router 2103 is referred to as the CR router 2103.

Later, the station 2101 is further configured to determine at least one second access point, in which the second access point and the first access point are connected to the same CR router 2103, and the first access point and the second access point are access points associated with the CR of the station 2101.

The station 2101 is further configured to send a CR enabling request message to the CR router 2103 corresponding to the CR router address through each of the access points associated with the CR of the station 2101, in which the external network identifiable address used by the station 2101 and an available bandwidth resource allocated to the station 2101 by an access point forwarding the CR enabling request message are recorded in the CR enabling request message.

The access point 2102 is configured to forward the CR enabling request message of the station 2101 to the router 2103. The access point 2102 includes the first access point and at least one second access point. The first access point and the second access point are access points associated with the CR of the station 2101. In FIG. 21, the access point 2102 further includes other access points except the access point associated with the CR of the station 2101, such as an access point connected to a router 2104 in the drawing. The router 2104 is not the CR router, the access point 2102 connected to the router 2104 is not the access point associated with the CR of the station 2101 either, and the router 2104 and the access point 2102 connected thereto do not participate in routing function enabling, and do not participate in sharing or transmission of the single session task either after the routing function is enabled.

The CR router 2103 is configured to receive the CR enabling request message sequentially, in which the CR enabling request message is sent from the station 2101, and forwarded by the first access point and the second access point.

The CR router 2103 is further configured to record correspondence between the external network identifiable address used by the station 2101 and a distribution address identifier of each of the first access point and the second access point, so that the CR router 2103 selects a downlink access point according to the available bandwidth resource of the access point and the correspondence, in which the distribution address identifier is sent to the CR router when the first access point and the second access point forward the CR enabling request message.

Here, the selected downlink access point is selected from access points associated with the CR of the station.

The CR router 2103 is further configured to send a CR enabling feedback message to the station 2101 via the first access point and the second access point, so that the station 2101 is capable of sending different data packets of a single session task through the first access point and the second access point separately.

Further, the first access point in the access point 2102 is further configured to broadcast a beacon frame, in which the beacon frame includes the address of the CR router connected to the first access point.

The station 2101 is further configured to send a router address request message to the first access point.

The first access point in the access point 2102 is further configured to return a router address feedback message to the station 2101. The router address feedback message carries the address of the CR router connected to the first access point.

The station 2101 is further configured to send a DHCP request to a DHCP server through each connected access point, to ask for a router address. The DHCP server returns a DHCP feedback to the station 2101, in which the DHCP feedback carries the router address.

The DHCP server can be integrated on a corresponding access point in a same subnet; or can also be used as an independent device and connected to a corresponding access point.

The access point 2102 except the first access point is further configured to broadcast a beacon frame, in which the beacon frame includes an address of a router connected to a corresponding access point.

The station 2101 is further configured to determine, from each access point 2102 sending the beacon frame, at least one second access point connected to the same CR router 2103 with the first access point.

Another manner of determining a second access point is: the station 2101 sends a router address request message to each connected access point 2102 except the first access point. The access point 2102 sends a router address feedback message, in which the router address feedback message carries an address of a router connected to the access point 2102 sending the router address feedback message. When the router address in the router address feedback message is the address of the CR router connected to the first access point, the station 2101 determines the access point 2102 returning the CR router address as the second access point.

Still another manner of determining a second access point is: the station 2101 sends a DHCP request to a DHCP server corresponding to each access point 2102 through each connected access point 2102 except the first access point, to ask for a router address. The DHCP server returns a DHCP feedback, in which the DHCP feedback carries the router address. When the router address in the DHCP feedback is the CR router address, an access point corresponding to the DHCP server returning the CR router address is determined as the second access point.

It can be seen that, the station 2101 can determine, from the beacon frame, the router address feedback message and the DHCP feedback, the address of the CR router connected to the first access point, and determine the second access point connected to the same the CR router with the first access point. Both the first access point and the second access point are access points associated with the CR of the station 2101.

Furthermore, before the station 2101 sends the CR enabling request message, the station 2101 is further configured to send a resource request message to the access points associated with the CR of the station 2101 separately. The access point of the access point 2102 and associated with the CR of the station 2101 is further configured to: after receiving the resource request message, return a resource feedback message to the station 2101, in which an available bandwidth resource allocated to the station 2101 by the access points associated with the CR of the station 2101 is recorded in the resource feedback message, so that the station 2101 selects an access point to perform data packet transmission according to the available bandwidth resource.

The station 2101 selects an access point from the access points associated with the CR of the station 2101 (namely, the first access point and the second access point) according to the available bandwidth resource to transmit a data packet.

The embodiment of the present invention provides a system for enabling a routing function. In one aspect, the station 2101 obtains the address of the CR router, determines an access point associated with the CR of the station 2101, sends the CR enabling request message to the CR router through the access point associated with the CR of the station 2101, and receives the CR enabling feedback message returned by the CR router, so as to implement enabling of the CR routing function. In the other aspect, the CR router also obtains the available bandwidth resource allocated to the station 2101 by the access point, and records correspondence between an external network identifiable address of the station 2101 and a distribution address identifier of an access point associated with the CR of the station 2101, so that in data transmission among the station 2101, the access point, the CR router, and the external network, and data packets of a single session task are transmitted through different access points associated with the CR of the station 2101.

Figure 22:
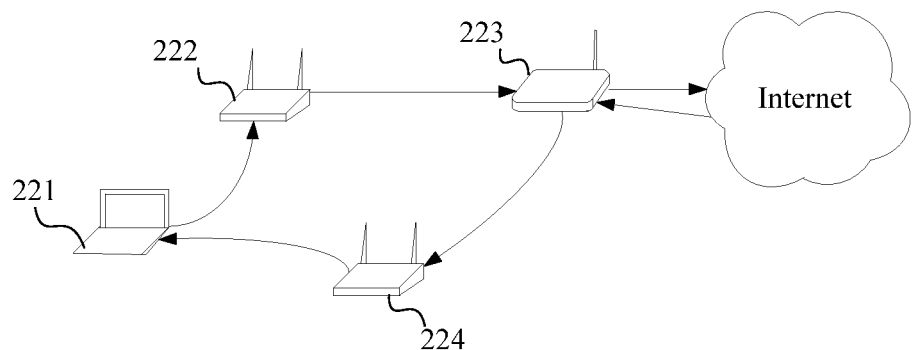
FIG. 22 is a schematic diagram of a system for transmitting data provided in Embodiment 5 of the present invention.

The embodiment of the present invention further provides a system for transmitting data, and as shown in FIG. 22, the system includes a station 221, an access point 222, an access point 224 and a CR router 223. The CR router 223 and an external network are in communication, and exemplarily, the external network in FIG. 22 is Internet. The access points 222 and 224 are access points associated with the CR of the station.

For a manner of determining an access point associated with the CR of the station, reference can be made to the foregoing part of Embodiment 5 of the present invention, which is not described anymore here.

The station 221 is configured to: for each uplink data packet of a single session task to be sent, select, according to available bandwidth resources allocated to the station by access points associated with a CR of the station, an uplink access point from the access points associated with the CR of the station, and send different uplink data packets to a CR router 223 via the uplink access point.

The access point 222 as an uplink access point is configured to send the uplink data packet sent by the station 221 to the CR router 223.

The CR router 223 is configured to receive each uplink data packet of the single session task sent by the station 221 and forwarded via the uplink access point, and send the uplink data packet to the destination address of the uplink data packet. Here the mentioned destination address of the uplink data packet is an address at which the uplink data packet is received in Internet.

The CR router 223 is further configured to receive each downlink data packet of the single session task sent from the source address of the downlink data packet, and find a corresponding distribution address identifier according to the destination address of the downlink data packet. Specifically, the CR router 223 finds a corresponding distribution address identifier in correspondence between an external network identifiable address used by the station and stored in the CR router 223 itself and a distribution address identifier of the access point associated with the CR of the station according to the destination address of the downlink data packet.

The CR router 223 is further configured to select a downlink access point according to the available bandwidth resource allocated to the station 221 by the access point associated with the CR of the station and the distribution address identifier, and send the downlink data packet to the downlink access point, in which the downlink data packet is forwarded to the station 221 by the downlink access point. Exemplarily, in FIG. 22, the downlink access point selected by the CR router 223 is the access point 224. In an actual application, if an access point is both capable of satisfying the uplink data transmission requirement and capable of satisfying the downlink data transmission requirement, this access point can be used as an uplink access point and a downlink access point simultaneously.

The access point 224 as the downlink access point is configured to forward the downlink data packet to the station 221.

After receiving the downlink data packet, the station 221 uses the downlink data packet according to a sequence of the downlink data packet.

A TCP data packet carries its own serial number, so for the TCP data packet, tunnel encapsulation may not be performed, and it is unnecessary to add a serial number; no matter whether it is an external network device or a station, the external network device or the station can use the TCP data packet in sequence according to the serial number carried in the TCP data packet itself. However, a UDP data packet itself has no serial number, and cannot identify a sequence of each UDP data packet, so the data packet receiving sequence can be ensured by adding a serial number into tunnel encapsulation.

Specifically, in the uplink direction, the station 221 performs tunnel encapsulation on each uplink data packet to be sent of the single session task, to generate the encapsulated uplink data packet, and sends the different encapsulated uplink data packets to the CR router 223 via an uplink access point. The tunnel header of the tunnel encapsulation includes the serial number of current uplink data packets; the tunnel header of the tunnel encapsulation includes a CR router address used as the tunnel destination address. After the encapsulated data packet is transmitted to the CR router 223, the CR router 223 forwards the decapsulated uplink data packet to the destination address of the uplink data packet according to a sequence of the serial numbers.

In the downlink direction, the CR router 223 performs tunnel encapsulation on the downlink data packet, to generate an encapsulated downlink data packet, in which a tunnel header of the tunnel encapsulation includes a serial number used for denoting a receiving sequence of the downlink data packet, an address of the CR router 223 as a tunnel source address, and a distribution address identifier as a tunnel destination address. The CR router 223 sends the encapsulated downlink data packet to the downlink access point, so that the downlink access point forwards the encapsulated downlink data packet to the station 221. After receiving the encapsulated downlink data packet, the station 221 decapsulates the received downlink data packet, to obtain a serial number, and uses the downlink data packet according to the serial number.

The embodiment of the present invention provides a system for transmitting data, where after a data packet is encapsulated with a serial number, an access point is selected according to an available bandwidth resource allocated by the access point for the station to transmit data, so that data traffic of a single session task is balanced to different access points and transmitted, thereby implementing data distribution under a situation that bandwidth of a single access point is limited, and ensuring communication quality.

A person of ordinary skill in the art may understand that, all or a part of the steps in the foregoing method embodiments may be implemented by a program instructing relevant hardware. The foregoing program may be stored in a computer readable storage medium. When the program runs, the foregoing steps in the method embodiments are performed. The foregoing storage medium may be any medium capable of storing program code, such as a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for enabling a routing function, comprising:
determining an address of a club routing (CR) router connected to a first access point when a station uses an external network identifiable address and performs data transmission of a single session task through the first access point;
determining a second access point, wherein the second access point and the first access point are each connected to the CR router, wherein the first access point and the second access point are access points associated with the CR of the station;
sending a CR enabling request message to the CR router that corresponds to the address of the CR router through each of the access points associated with a CR of the station, wherein the external network identifiable address used by the station and an available bandwidth resource allocated to the station by an access point forwarding the CR enabling request message are recorded in the CR enabling request message; and
receiving a CR enabling feedback message, wherein the CR enabling feedback message is returned by the CR router and forwarded via the access points associated with the CR of the station, wherein the CR enabling feedback message comprises a distribution address identifier of a selected downlink access point, wherein the station separately sends different data packets of the single session task through the first access point and the second access point.

2. The method according to claim 1, wherein determining the address of the CR router connected to the first access point comprises receiving a beacon frame broadcast by the first access point, and wherein the beacon frame comprises the address of the CR router connected to the first access point.

3. The method according to claim 1, wherein determining the address of the CR router connected to the first access point comprises:
sending a router address request message to the first access point; and
receiving a router address feedback message returned by the first access point, wherein the router address feedback message carries the address of the CR router connected to the first access point.

4. The method according to claim 1, wherein determining the address of the CR router connected to the first access point comprises:
sending, to a dynamic host configuration protocol (DHCP) server, a DHCP request to request the address of the CR router connected to the first access point; and
receiving a DHCP feedback returned by the DHCP server, wherein the DHCP feedback carries the address of the CR router connected to the first access point.

5. The method according to claim 1, wherein determining the second access point comprises:
receiving a beacon frame broadcast by each access point except the first access point, wherein the beacon frame comprises an address of a router connected to a corresponding access point; and
determining, from each access point sending the beacon frame, at least one access point connected to the CR router with the first access point as the second access point.

6. The method according to claim 1, wherein determining the second access point comprises:
sending a router address request message to each access point, but not the first access point;
receiving a router address feedback message returned by each access point, wherein the router address feedback message carries an address of a router connected to the access point sending the router address feedback message; and
determining an access point returning a CR router address as the second access point when the address of the router in the router address feedback message is the CR router address.

7. The method according to claim 1, wherein determining the second access point comprises:
sending a dynamic host configuration protocol (DHCP) request to a DHCP server through each connected access point except the first access point, to request a router address;
receiving a DHCP feedback returned by the DHCP server, wherein the DHCP feedback carries the router address; and
determining an access point corresponding to the DHCP server returning a CR router address as the second access point when the router address in the DHCP feedback is the CR router address.

8. The method according to claim 7, wherein the DHCP server is integrated on a corresponding access point in a same subnet.

9. The method according to claim 1, wherein quality of service (QoS) information of the station is further recorded in the CR enabling request message.

10. The method according to claim 1, wherein before the sending the CR enabling request message, the method further comprises:
sending a resource request message to each of the access points associated with the CR of the station; and
receiving a resource feedback message returned by each of the access points associated with the CR of the station, wherein an available bandwidth resource allocated to the station by the access points associated with the CR of the station is recorded in the resource feedback message, and wherein the station selects an access point to perform data packet transmission according to the available bandwidth resource.

11. A method for enabling a routing function, comprising:
receiving a club routing (CR) enabling request message sequentially, wherein the CR enabling request message is sent from a station and independently forwarded by a first access point and a second access point, wherein an external network identifiable address used by the station and an available bandwidth resource allocated to the station by an access point forwarding the CR enabling request message are recorded in the CR enabling request message, and wherein the first access point and the second access point are access points associated with a CR of the station;
recording a correspondence between the external network identifiable address used by the station, a first distribution address identifier of the first access point and a second distribution address identifier of the second access point, wherein a CR router selects a downlink access point according to the available bandwidth resource of the access point and the correspondence, wherein a distribution address identifier of a selected downlink access point is sent to the CR router when the first access point and the second access point forward the CR enabling request message; and
sending a CR enabling feedback message to the station via the first access point and the second access point, wherein the station is capable of separately sending different data packets of a single session task through the first access point and the second access point.

12. The method according to claim 11, wherein a quality of service (QoS) information of the station is further recorded in the CR enabling request message, wherein the CR router selects the downlink access point according to the QoS information.

13. A station, comprising:
a memory;
a processor coupled to the memory and configured to cause the station to:
determine a club routing (CR) router address of a CR router connected to a first access point when a station uses an external network identifiable address and performs data transmission of a single session task through the first access point;
determine a second access point, wherein the second access point and the first access point are each connected to the CR router, wherein the first access point and the second access point are access points associated with the CR of the station;
send a CR enabling request message to the CR router that corresponds to the CR router address through each of the access points associated with the CR of the station, wherein the external network identifiable address used by the station and an available bandwidth resource allocated to the station by an access point forwarding the CR enabling request message are recorded in the CR enabling request message; and
receive a CR enabling feedback message, wherein the CR enabling feedback message is returned by the CR router and forwarded via the access points associated with the CR of the station, wherein the station separately sends different data packets of the single session task through the first access point and the second access point.

14. A club routing (CR) router, comprising:
a memory;
a processor coupled to the memory and configured to cause the CR router to:
receive a CR enabling request message sequentially, wherein the CR enabling request message is sent from a station and forwarded by a first access point and a second access point, wherein an external network identifiable address used by the station and an available bandwidth resource allocated to the station by an access point forwarding the CR enabling request message are recorded in the CR enabling request message, wherein the first access point and the second access point are access points associated with the CR of the station;
record a correspondence between the external network identifiable address used by the station, a first distribution address identifier of the first access point and a second distribution address identifier of the second access point, wherein the CR router selects a downlink access point according to the available bandwidth resource of the access point and the correspondence, and wherein a distribution address identifier of a selected downlink access point is sent to the CR router when the first access point and the second access point forward the CR enabling request message; and
send a CR enabling feedback message to the station via the first access point and the second access point, so that the station is capable of separately sending different data packets of a single session task through the first access point and the second access point.

* * * * *